United States Patent
Shikano et al.

(10) Patent No.: US 7,340,078 B2
(45) Date of Patent: Mar. 4, 2008

(54) MULTI-SENSING DEVICES COOPERATIVE RECOGNITION SYSTEM

(75) Inventors: Hiroaki Shikano, Kokubunji (JP); Naohiko Irie, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 688 days.

(21) Appl. No.: 10/876,596

(22) Filed: Jun. 28, 2004

(65) Prior Publication Data
US 2005/0078854 A1  Apr. 14, 2005

(30) Foreign Application Priority Data
Oct. 8, 2003  (JP)  .............. 2003-348980

(51) Int. Cl.
*G06K 9/00*  (2006.01)
(52) U.S. Cl. ...................... 382/103; 348/154
(58) Field of Classification Search ................ 382/100, 382/103, 107; 348/143, 154, 155, 169, 170–172; 342/20, 52–59
See application file for complete search history.

(56) References Cited

U.S. PATENT DOCUMENTS 6,359,647 B1 *  3/2002  Sengupta et al. ........... 348/154
6,498,628 B2 *  12/2002 Iwamura ..................... 348/734
6,583,723 B2 *  6/2003  Watanabe et al. ......... 340/573.1
2004/0201710 A1 * 10/2004 Uchihashi et al. ......... 348/211.2

FOREIGN PATENT DOCUMENTS

JP  07-306012  5/1994
JP  11-015981  6/1997

* cited by examiner

*Primary Examiner*—Samir Ahmed
*Assistant Examiner*—Anand Bhatnagar
(74) *Attorney, Agent, or Firm*—Reed Smith LLP; Stanley P. Fisher, Esq.; Juan Carlos A. Marquez, Esq.

(57) ABSTRACT

Disclosed here is an information processing system capable of recognizing actions and circumstances of a user with respect to both space and time as a "situation" to recognize the user's request using a plurality of sensing nodes that work cooperatively with each another, thereby responding autonomously to the user's request according to the recognition results. The plurality of sensing nodes and a responding device are disposed in a target space to build up a network for recognizing the situation in the target space. And, a plurality of recognition means are used to recognize the situation with respect to both space and time related to the existence of the user. And, an integral processing portion (master) is selected from among the plurality of sensing nodes, thereby dispersing the system load. If there are a plurality of users, the system can make recognition in accordance with the request of each of those users.

16 Claims, 14 Drawing Sheets

MULTI-SENSING DEVICES COOPERATIVE RECOGNITION SYSTEM

CLAIM OF PRIORITY

The present application claims priority from Japanese application JP 2003-348980 filed on Oct. 8, 2003, the content of which is hereby incorporated by reference into this application.

FIELD OF THE INVENTION

The present invention relates to a recognition processing system for recognizing actions and circumstances of each user in a space using a plurality of processing devices.

BACKGROUND OF THE INVENTION

Now that we are coming into an age of ubiquitous, it is expected that we are to be surrounded by many sensing nodes for recognizing our actions and circumstances. For example, IC and RF tags have come to be employed recently to track physical distribution of things. And, IT (Information Technology) devices used to recognize our actions and circumstances come to be able to respond to our requests autonomously while those IT devices have responded only when they are instructed so conventionally.

The technology for recognizing circumstances of an object uses recognition devices. Conventional general recognition devices are used only to recognize a single item, for example, faces and detect persons by using such single input means as cameras and implementing a single recognition algorithm in a single information processing device fixedly. In order to trace/manage a position and moving line of a person in a space, a plurality of such input means as cameras and information processing devices are disposed hierarchically to form an efficient processing apparatus, which is disclosed in, for example, patent documents 1 and 2.

[Patent document 1] Official gazette of JP-A No. 15981/1999

[Patent document 2] Official gazette of JP-A No. 306012/1995.

The present inventor et al have found that it is possible to provide services that are completely different from conventional ones by combining intelligent sensing nodes that can recognize images and voices, as well as perform intellectual processings so that those nodes can cooperate with each another to recognize the actual world.

Each of the IC and RF tags as described above can retain ROM data of only a few hundreds of bytes as a unique ID number consisting of a few hundreds of digits. Each node that is such simple in function can thus sense only part of information in the actual world. For example, conventional recognition devices as disclosed in the patent documents 1 and 2 have been used to achieve a single purpose such as detecting an object, a position of the object in a predetermined space, or the like, so that they are difficult to recognize circumstances of a target person to recognize not only the physical information in a space, but also the situation in the space with respect to the time axis.

SUMMARY OF THE INVENTION

Under such circumstances, it is an object of the present invention to provide a system that recognizes actions and circumstances of each user multilaterally using a plurality of sensing nodes that are cooperative in operation with each another, that is, recognizes each action of the user with respect to both space and time in real time as a "situation", thereby recognizing his/her request and circumstances to respond to him/her autonomously according to the result of the recognition.

The above and further objects and novel features of the present invention will more fully appear from the following detailed description and the accompanying drawings in this specification.

Typical aspects of those to be disclosed in this specification to solve the above conventional problems will be described briefly as follows.

According to one aspect of the present invention, the information processing system comprises a plurality of sensing modules including cameras, as well as a responding device. Each of the plurality of sensing modules recognizes a moving object in a predetermined space using a plurality of recognition methods and sends the recognition result to the master sensing module selected from the plurality of sensing modules. The master sensing module then sends a command to instruct the responding device to take an action in accordance with the recognition result and the responding device begins the action specified by the received command.

More preferably, the master sensing module, when recognizing a state (situation) change of the object in the space, instructs the plurality of sensing modules to change the recognition means, the algorithm, or the combination of the plurality of sensing modules in accordance with the state change detected in the space.

According to another aspect of the present invention, the master sensing module, when recognizing a state (situation) change in the space, selects one sensing module from the plurality of sensing modules as another master in accordance with the changed state (situation) in the space.

According to still another aspect of the present invention, the master sensing module, when recognizing the object that is moving out of the predetermined space, passes control to another system existing in the space into which the object moves.

According to still another aspect of the present invention, each of the plurality of sensing modules detects each of a plurality of moving objects according to a difference between frames positioned before and after a moving image photographed by a camera and sends the detected data to the master sensing module while the master sensing module measures the moving object at three points determined by the detected data received from the plurality of sensing modules, thereby detecting the position of each of the plurality of moving objects.

Each of the plurality of sensing modules is configured to recognize a gesture of a target user and send the recognition result to the master sensing module while the master sensing module is configured to recognize the meaning of the gesture according to the recognition result, thereby recognizing a state (situation) change of the object with respect to the time axis in the space.

The present invention that can recognize a situation with respect to both space and time in real time as described above can thus reduce the load of the whole system more than any of the conventional server-client systems.

DETAILED DESCRIPTION OF THE PREFERRED EMBODIMENTS

Figure 1:
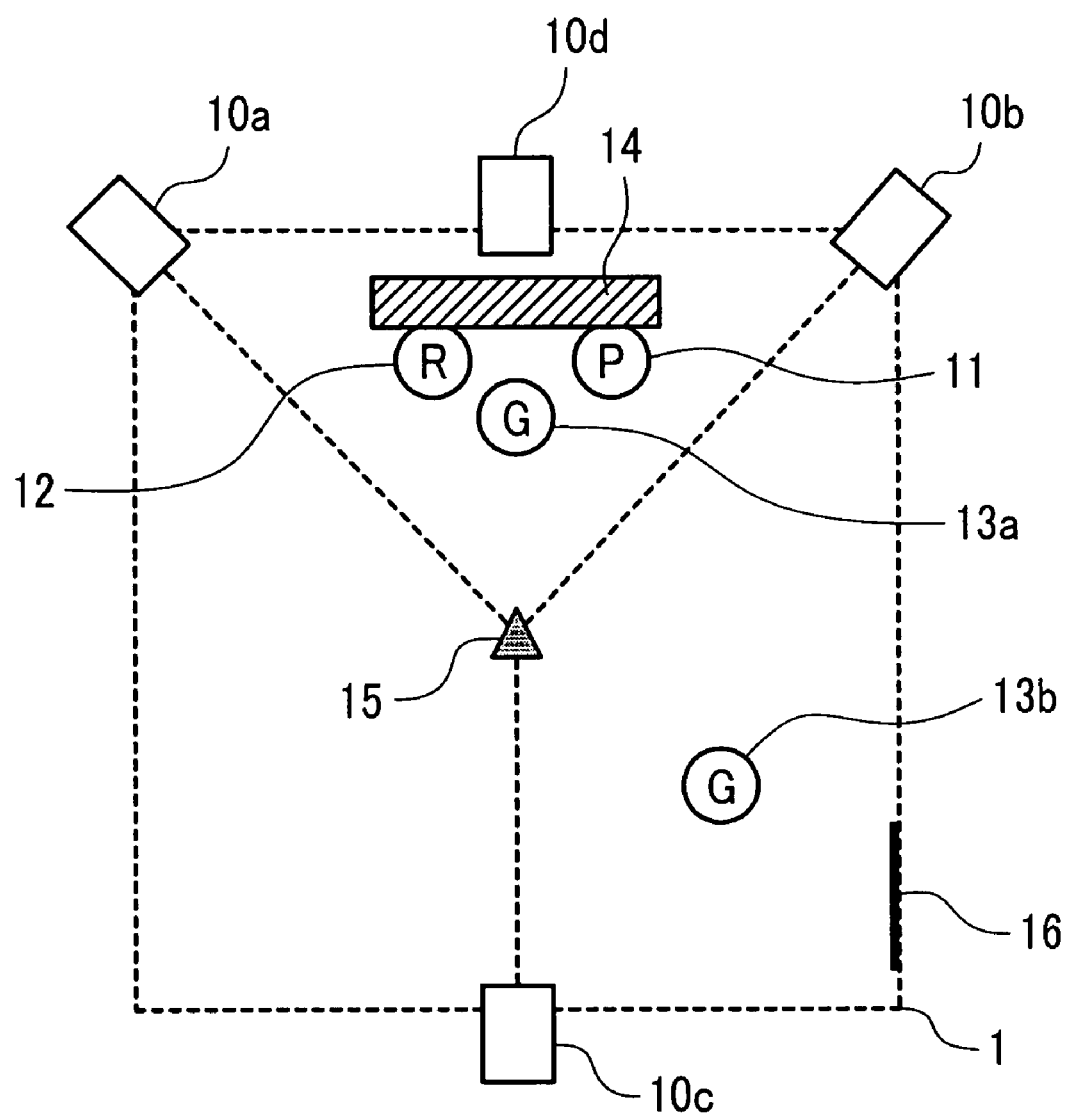
FIG. 1 is a block diagram of a presentation support system, which is a typical example of the present invention, to be employed for exhibitions.

Hereunder, a description will be made for a presentation support system used in a presentation booth in an exhibition, which is a typical example of an embodiment of the present invention. FIG. 1 shows a layout of the presentation booth (3×3 square meter space) in the exhibition. Four cameras (sensing nodes 10a to 10d (nodes, hereinafter)) provided with an information processing unit respectively are disposed in a target space to be recognized (1) so as to take an extensive view of the whole space. The number of such nodes may be determined freely in accordance with the purpose such as improving the recognition rate, enabling recognition of voices as an additional new function, etc. Those cameras may be combined freely with microphones and various types of sensors used for temperature, humidity, pressure, vibration, etc.

In this system, sensing nodes (10a) and (10b) are disposed on the same line closer to the panel in the presentation booth and a sensing node (10c) is disposed in the center of the opposite direction with a space from the panel. Another sensing node (10d) is disposed in front of the panel. At every sensing node, the viewing direction of each camera is determined so that the center line of the camera is aligned to the center point (15) in the space. Due to the cooperative recognition processings by those nodes, this system detects positions of a presenter (11), visitors (13a and 13b), the face of the visitor (13a), the gesture of the presenter (11) while the responding device (12) (pet robot, portable phone, or the like) takes an action for the visitor (13a) according to the result.

In this embodiment, it is assumed to recognize actions of the visitors and the gestures of the presenter existing around the panel respectively as "visitors shown their interests in the panel", "waiting for presentation", "on presentation", etc. In other words, the faces of the visitors and the gestures of the presenter may be required to be recognized just around the panel. This is why the sensing nodes (10a to 10c) are disposed at three points as shown in FIG. 1, so that the positions of the presenter (11) and the visitors (13a and 13b) are detected while the sensing node (10d) is disposed around the panel (14) to detect the face of the visitor (13a) and the gesture of the presenter (11). And, because the functions of those sensing nodes are divided such way, each sensing node comes to be limited functionally, thereby the processing load of each of the sensing nodes (10a to 10d) is reduced.

In the above recognition process, a state divided by the time axis with respect to the presenter is defined as a "situation". For example, a situation may be any of "waiting for visitors", "waiting for presentation", "on presentation", etc. In other words, a "situation" is defined as an object state in a target space at a specified time. More concretely, a "situation" is defined by a state in a target space at a specified time and the "situation" assumed until the specified time is reached. And, a "situation" may be referred to as a state assumed in accordance with a service required by the user to be recognized at that time. For example, if a visitor is around the panel (14), the "situation" becomes "the visitor wants to receive presentation" or "the visitor is on presentation". The sensing nodes, recognition means/methods, and automatic responses used for each "situation" in the target space are changed to provide the users (the presenter and the visitor in this system) with optimal information. For example, if the sensing nodes (10a to 10c) detect that there is no visitor around the panel 14, the "situation" becomes "waiting for explanation" and the system can instruct the responding device 11 (robot, for example) to take an action for calling the visitor's attention to the panel 14. If the sensing node (10d) detects another visitor who seems to be interested in the panel while the situation is "under explanation", the system can instruct the responding device 11 (robot, for example) to speak to the visitor like "wait for a moment, please" and send a mail to the portable phone, etc. of another presenter who is in another place to instruct him/her to return to the panel 14 immediately.

Figure 2:
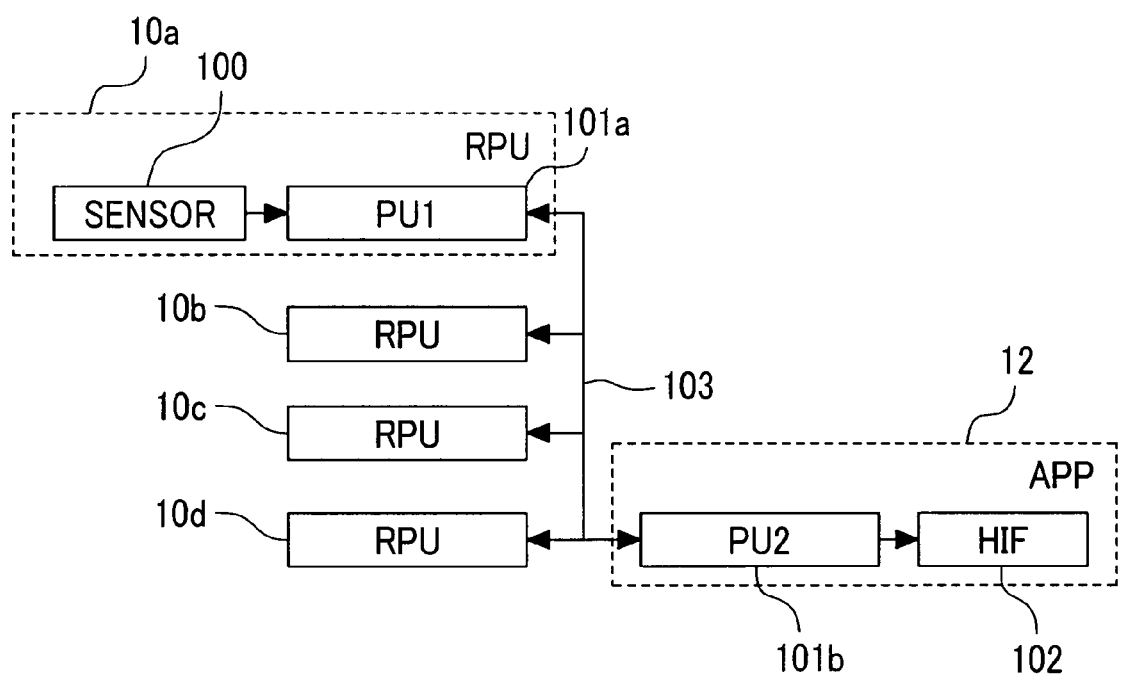
FIG. 2 is a block diagram of a system configuration of the exhibition support system shown in FIG. 1.

FIG. 2 shows a block diagram of this system. Each of the sensing nodes (recognition processing units) RPU (10a to 10d) is configured by such a sensor SENSOR (100) as a camera and an information processing unit PU1 (101a) for performing recognition process on motion images photographed by the camera. Those sensing nodes RPU are connected to each another and a responding device APP (12) through a network (103). The responding device APP (12) responds to the user directly through such a portable device as a robot, portable phone, or the like. The network (103) may be any of such a wired network as Ethernet and such a wired network as a wireless LAN, Blue Tooth one, or the like. The automatic responding device APP (12) is configured by a human interface HIF (102) used as, for example, a display, speaker, LED, or the like for presenting information to the user and an information processing unit PU2 (101b) for decoding commands and controlling the human interface HIF (102) autonomously. Each of those PU1 and PU2 (101a and 10b) should preferably be built in the sensing node RPU and the responding device RPU respectively. Consequently, the sensing nodes can be reduced in size respectively, so that more sensing nodes come to be disposed in the space. If it is expected that such built-in sensing nodes might cause any trouble in the processing performance of the system, however, it may be replaced with any existing information processing unit such as a personal computer.

In this system, no server is provided for controlling the sensing nodes RPU (10a to 10d) and the responding device APP (12); a master device is selected dynamically from among the plurality of sensing nodes RPU (10a to 10d) and the responding device APP (12). The selected master (node or device) then controls other sensing nodes and the responding device integrally. For example, a device closest to the target user is determined as a master and a network is configured by the master and its peripheral sensing nodes dynamically to enable the user to receive necessary information from another sensing node. As a result, the user comes to receive a required service independently. However, if the target space is fixed just like a booth in a presentation site and only the presenter who is supposed to be just around the panel (14) is assumed as an expected user, there is no need to change the master dynamically.

Figure 3:
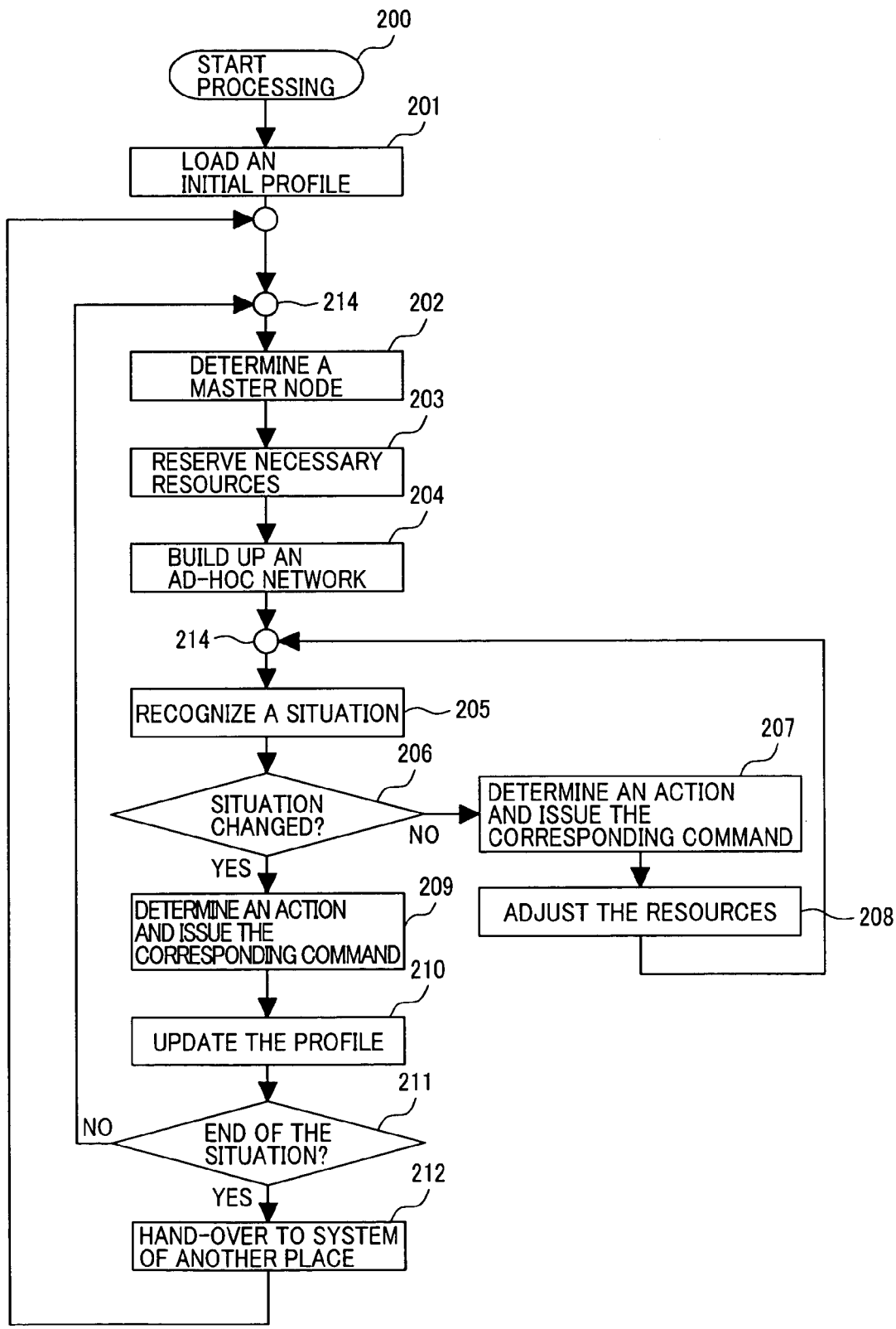
FIG. 3 is a flowchart of multi-media and algorithms cooperative recognition processings.
Figure 4:
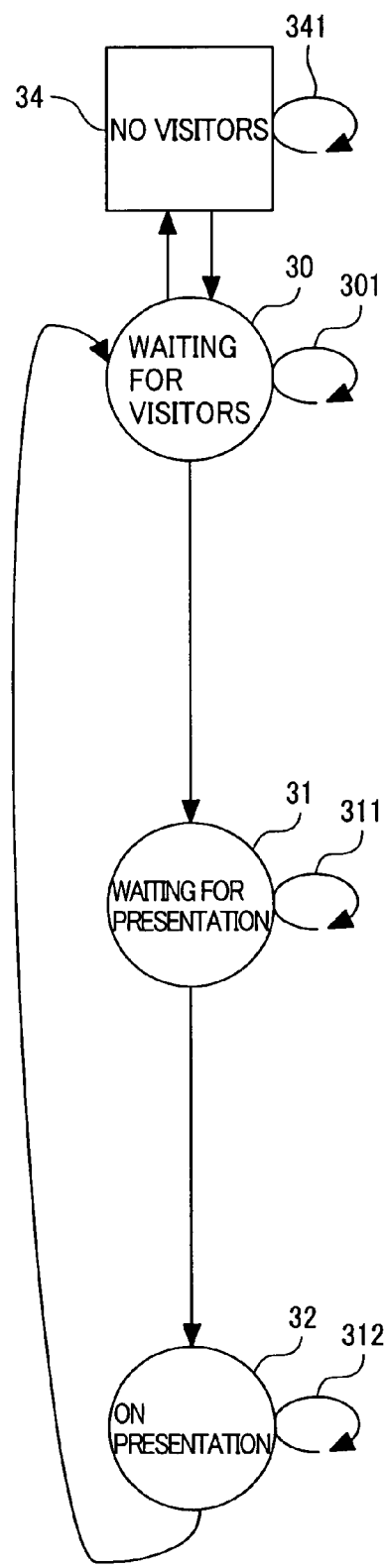
FIG. 4 illustrates how a "situation" changes in the presentation in an exhibition.
Figure 4:
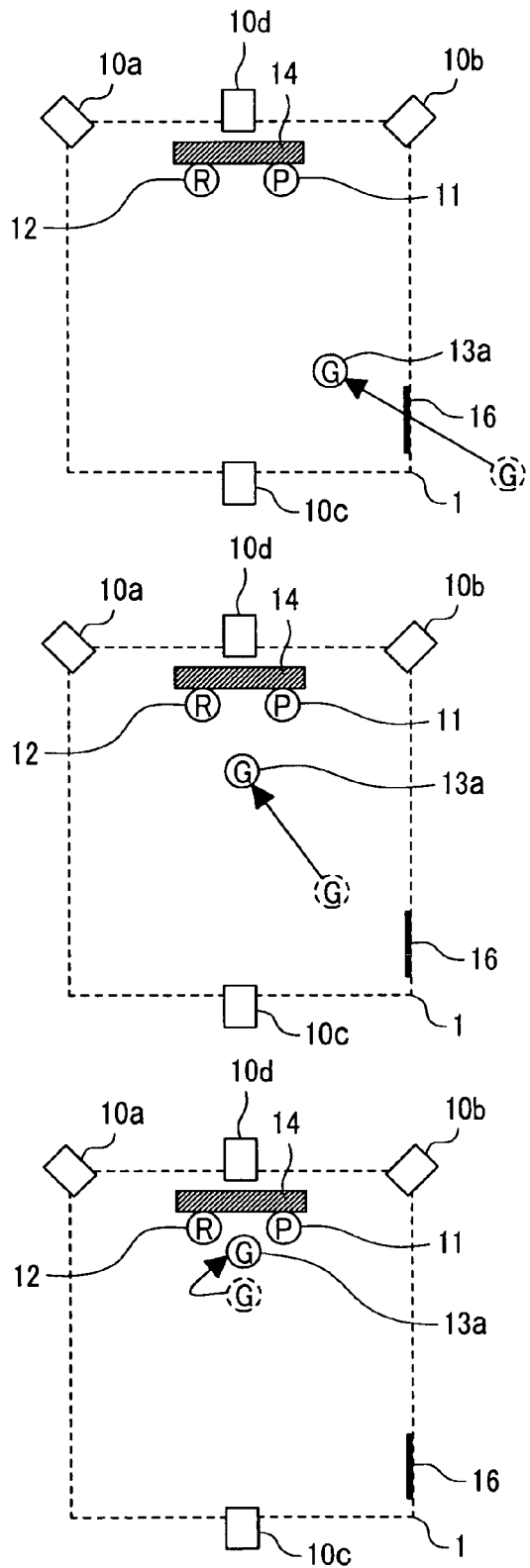

Next, a processing flow of this system will be described with reference to FIGS. 3 and 4. FIG. 3 shows a processing flow of the system and FIG. 4 shows how a situation is changed. In this case, the processing flow of the system expects just one user so as to simplify the description. When a processing begins (200), each of the sensing nodes (10a to 10d) and the responding device (12) sets an initial profile that denotes an operation procedure in the initial state (201). The initial state (situation) of the system is, for example, "no visitors" (34) as shown in FIG. 4. The "no visitors" state means that there is no visitor in the target space to be recognized, that is, a state in which there is no target user. The profile defines the position, operation procedure, and recognition program body of each of the sensing nodes (10a to 10d) existing in the target space and the responding device (12). After that, a master is determined (202). At the start-up time of the processing, the sensing node (10a) that can take an extensive view of the entrance is determined as the master of the space (1). After that, other sensing nodes and the responding device required for the recognition processing defined in the profile are reserved (203), and then a network is configured by those sensing nodes and the responding device (204). In this system, such a network is configured by all the devices existing in the target space (1). The space (1) in this embodiment has only one entrance and all the visitors come into the space through the entrance. Thus, other sensing nodes (10b to 10d) may stand by to reduce the power consumption.

This completes the initialization, and then a space recognition processing begins (205). In the state (situation) "no visitors", this processing (205) detects a visitor (13a) with sensing nodes (10a to 10d). When the visitor (13a) takes an action (coming into the space through the entrance (16)), a situation "waiting for visitors" (30) arises (situation change). The situation "waiting for visitors" denotes that there is a visitor (13a) in the target space (1), but there is no visitor (10a) around the panel (14) that gives services. In other words, the visitor (10a) needs information of the services available in the space (1). The sensing node (10a) that is the master in the space (1) then issues a command in accordance with the situation change to "waiting for visitors" (30) to other sensing nodes (10b to 10d) and each of the sensing nodes (10a to 10d) thus reads a profile corresponding to the situation of "waiting for visitors (30) to update the old profile (210). In the profile updating, each of the sensing nodes (10b to 10d) also read information of a function module, that is, a position detection module required for the situation "waiting for visitors" (30). At that time, the master sensing node can also issue a command for instructing the responding device (11) to take an action for determining the presentation on the panel (14) for the visitor (13a). After that, the system determines whether or not the situation ends (211). The end of the situation will be described later in detail. At that time, the situation is not ended yet, since a visitor is in the target space. The system thus returns to the processing flow (step 214) to determine the master (step 202). The current situation is "waiting for visitors" and it is detected whether or not the visitor (13a) goes to the panel (14). In other words, the master may be any of the sensing nodes (10a to 10c) that can detect the target position. In that case, the sensing node (10c) closest to the visitor (13a) is determined as a new master. After that, resources are reserved and obtained (203) to build up a network, and then the situation in the space is recognized (205). In the situation "waiting for visitors" as described above, the position of the visitor (13a) is detected.

If the visitor (13a) moves toward the panel (14), the situation becomes "waiting for presentation" (31) in the system. In the situation "waiting for presentation", the presenter does not explain yet, although the visitor (13a) is around the panel (14). In other words, the visitor (13a) wants to be explained about the information displayed on the panel (14) in that situation. At that time, the sensing node (10c) sends an action command to the responding device (12) (209). In response to the action command, the responding device (12) takes the action. For example, if the visitor (13a) stops at a place where the panel (14) is seen, the responding device (12) speaks to the visitor (13a) with a message "Hello!" If the visitor stops far from the place where the panel (14) is not seen, the responding panel (14) utters a message "Please, come close to the panel". If such an action for prompting a situation change is recognized such way, the system also issues a command defined in the profile in accordance with the situation change (209). For example, the system issues a command that changes the situation from "waiting for visitors" (30) to "waiting for presentation" (31), so that each of the sensing nodes (10a to 10d) reads the situation profile of "waiting for presentation" (210). At that time, the profile includes a position detection module for detecting whether or not the visitor (13a) continues to be around the panel (14), a face detection module for detecting whether or not the visitor (13a) is interested in (looking at) the panel (14), and a gesture detecting module for detecting whether or not the presenter (12) begins explanation.

After that, the system returns to the processing flow (214) to determine the sensing node (10d) as the next master for determining whether or not the visitor is looking at the panel. After that, the system reserves and obtains necessary resources (203) to build up a network (204), then detects the positions of the presenter (12) and the visitor (13a), then the face of the visitor (13a) and the gesture of the presenter (12) (205).

The system, when recognizing a predetermined gesture of the presenter at that time, changes the situation to "on presentation" (32). In the "on presentation" situation, the presenter (12) explains for the visitor (13a). In other words, the visitor (13a) is receiving a service. The master sensing node (10d) thus issues a command to instruct the responding device (12), for example, to "give a name card" to the visitor (13a) (209). At the same time, the system issues a command to change the situation to "on presentation" (32) and each sensing node thus reads a profile related to the situation "on presentation" (32)(210), thereby the system returns to the processing flow (214). The profile includes the position detection module and the gesture detection module, but it does not include the face detection module, since the visitor (13a) is already looking at the panel (14) in the situation "on presentation" (32). Usually, the system then determines another master here. In that case, however, the visitor (13a) is around the panel 14, so the sensing node (10d) is kept as the master.

Then, the system reserves necessary sensing nodes and the responding device again (203) to build up a network (204). As described above, in the "on presentation" situation, the system is not required to detect the face of the visitor (13a) who comes to look at the panel using the sensing node (10d), so that the operation of the face detection module in the active sensing node (10d) stops, thereby reducing the load of the resources. In that situation, the position detection module and the gesture detection module continue their operations. However, in order to detect situation changes more accurately, the gesture detection module may be operated only when the presenter (12) is detected at a predetermined position. Consequently, the gesture of the presenter (12) is detected only when the presenter (12) makes a gesture for ending the presentation at the predetermined position. The system malfunction is thus prevented. If the system detects such a gesture for ending the presentation in a situation recognition process in the space (205), the situation is changed to the initial "waiting for visitors" (30)(322), the responding device (11) thus utters a message like "Good by" to the visitor (13a). At that time, however, because the visitor (13a) is supposed to be around the panel (14), the visitor (13a) is supposed to be in the situation "waiting for presentation" (31) from the position of the visitor (13a). However, the situation is already changed from "on presentation" (32), that is, the visitor (13a) is already explained. The situation is thus changed to "waiting for visitors" (30), not to "waiting for presentation" (31). In this embodiment, as described above, when a situation is changed to the next one, the previous situation is taken into consideration to determine the next situation.

If the visitor (13a) who is in the situation "waiting for visitors" (30) goes out of the target space (1), the situation is changed to "no visitor" (34). If a target user moves in a very large place, the situation change in each target space is required to be passed to another system in any of its peripheral spaces. Concretely, if a situation is defined as a physical space around a target user, the situation is required to be handed over (212). And, if the situation in the target space ends, since the user moves out of the space (211), that is, if the target visitor moves from the target space to another adjacent space, the master in the space hands over the situation to the master in the adjacent space so that a plurality of systems in such a very large place can work cooperatively.

While a processing flow with respect to situation changes has been described, no situation change occurs actually in this system in recognition of situations. In some cases, however, the recognition method itself might be required to be changed in sensing nodes (10a to 10d) due to an environmental change such as a change of the brightness in the target space and/or a movement of the target user. And, the system can also cope with such situation changes flexibly by re-adjusting resources and changing the masters, for example, by changing and stopping the subject recognition modules (208).

Figure 5:
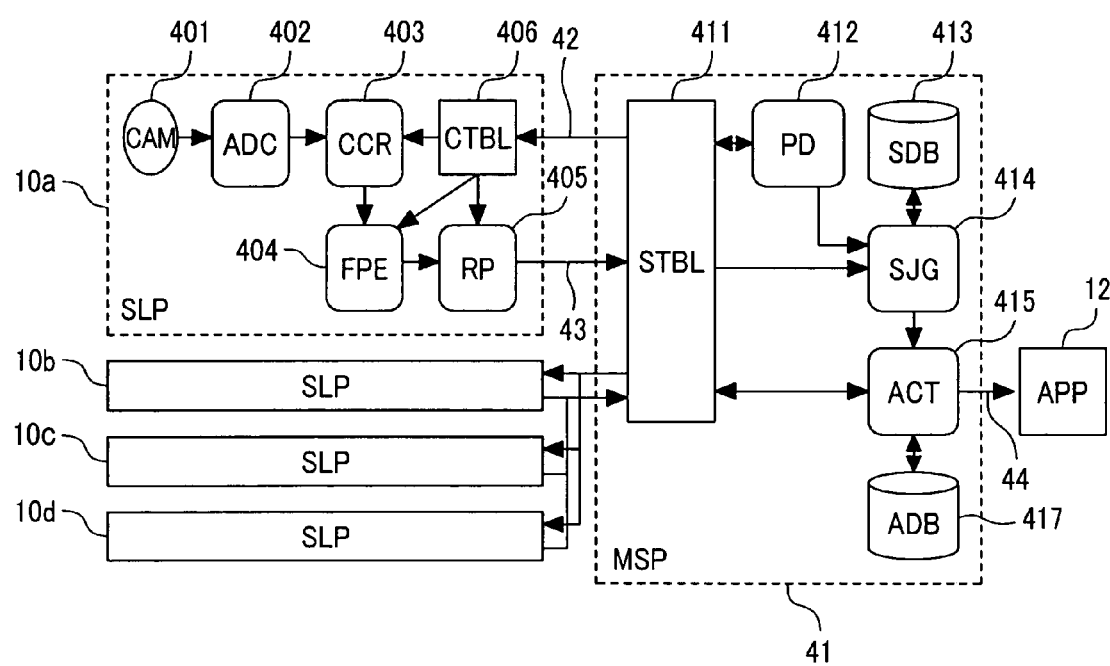
FIG. 5 is a functional block diagram of a master/slave processing portion in the exhibition support system.

Next, a description will be made briefly for recognition processings by a master processing portion MSP and each slave processing portion SLP of this system shown in FIG. 5. Each of the sensing nodes (10a to 10d) works as a slave processing portion for recognition processings. And, a sensing node, when it is defined as a master one, works as a master processing portion. Concretely, each of the sensing nodes (10a to 10d) can work as a master processing portion MSP (41) and a slave processing portion SLP as needed. Actually, a sensing node defined as a master works just as a master processing portion MSP (41). In each slave processing portion SLP, image data obtained by a camera CAM (401) is inputted to an A/D converter ADC (402) to be converted to digital signals, then subjected to YUV->RGB color conversion and filtering processing CCR (403) to be subjected to feature point extraction FPE (404) such as moving object detection, face detection, specific color detection, etc. After that, the center point of the moving object, the coordinates of the face on the camera images, the type of the gesture are recognized from the obtained feature points (405) and the result information is written in the table STBL of the master processing portion (41). In the table STBL, the old information is updated by new one as needed (step 43). Each of the correction, feature point extraction, and recognition processing modules is stored in the control table beforehand as profile information. Each module operation is controlled by the master processing portion so that each necessary operation module is set and an unnecessary module operation is stopped according to the operation module information (43) written in the control table STBL (411) by the master. And, because each of the sensing nodes (10a to 10d) extracts feature points, an amount of data to be transferred to the master processing portion is less than comparatively a large amount of image data itself to be sent to the master processing portion. In addition, because image processing that handles comparatively a large amount of data is performed on each of the sensing nodes (10a to 10d), the load of the master processing portion is reduced more than when image data is transferred as is to the master processing portion.

The master processing portion MSP (41) retains the recognition processing result received from each of the sensing nodes (10a to 10d) in the control table STBL (411) and reads the result from the table to perform a predetermined recognition processing. For example, the master processing portion MSP (41) determines a position of a moving object in a target space from the position information received from each of the sensing nodes (10a to 10d) (412). The master processing portion MSP (41) also makes a state (situation) determination (414) such as situation change and state change in the space according to the determined position information, gesture information identified by gesture recognition in the subject sensing node, and face detection in the sensing node in accordance with the rule data in the state database SDB (413), then issues an action command (44) to the responding device APP (12) according to the result. The command is built up as an object of which operation is defined in detail in the responding device APP (12) according to the information in the action rule database ADB (417) corresponding to the responding device APP (12).

Figure 6:
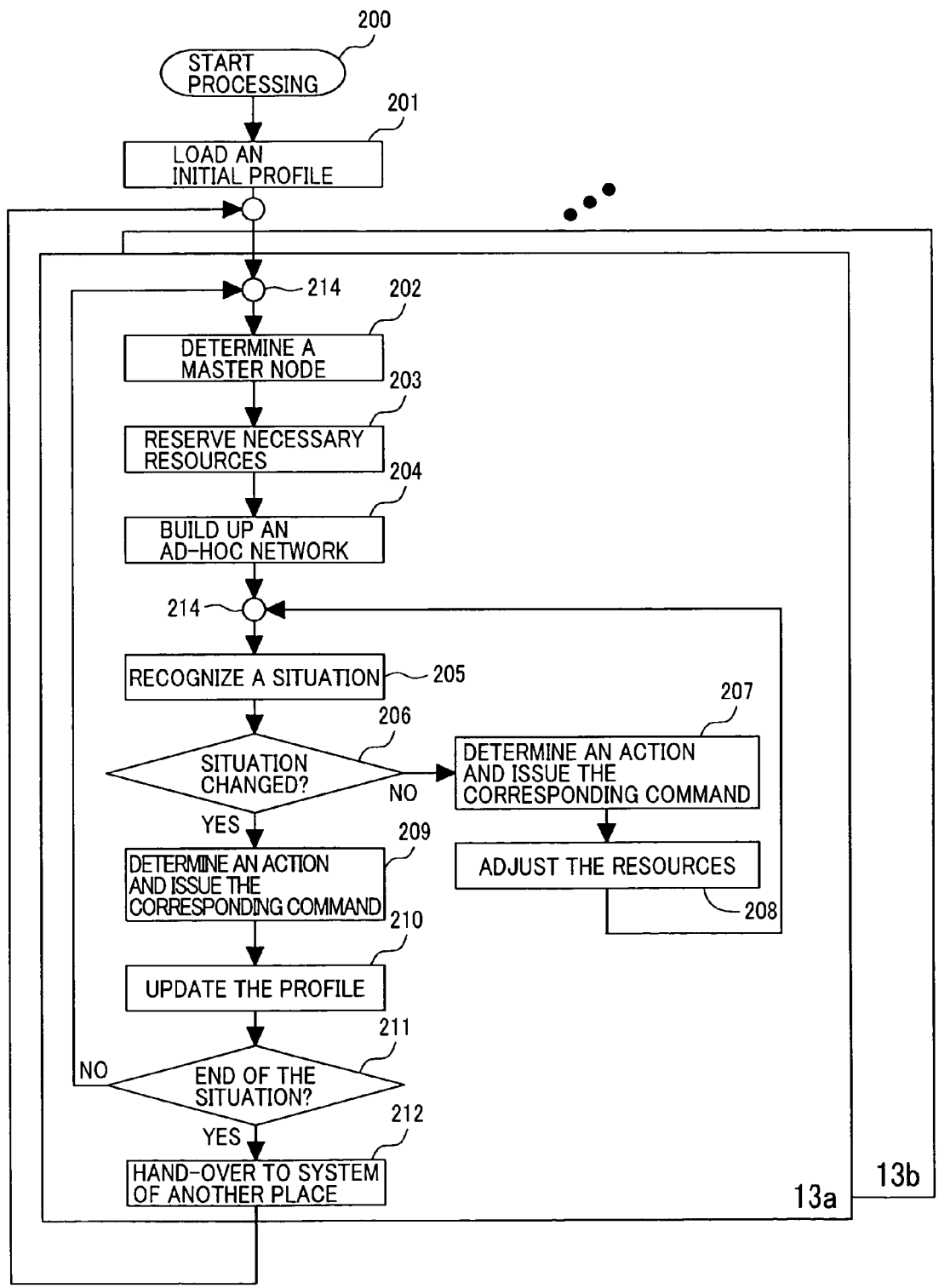
FIG. 6 is a flowchart of multi-media and algorithms cooperative recognition processings when there are a plurality of persons to be recognized.

While a description has been made for a case in which there is just one visitor, the description can also apply to a case in which there are a plurality of visitors. For example, while presentation is made for the visitor (13a), if another visitor (13b) comes into the target space, the system can execute both of the processing flow (613a) for the visitor (13a) and the processing flow (613b) for the visitor (13b) simultaneously as shown in FIG. 6. If the information processing unit PU1 of each sensing node is configured as a multi-processor consisting of a plurality of processors, the processing flows (613a and 613b) may be processed in different processors (parallel processing). If the information processing unit PU1 of each sensing node has just one processor, each of the processing flows (613a and 613b) is defined as a task and the tasks may be processed so as to be switched and executed in a time division manner. If a plurality of processing flows are executed simultaneously such way, the master processing portions are assigned to other sensing nodes, so that the processing flows (613a) and (613b) may be executed by different master sensing nodes. The load of the whole system is thus reduced.

As described above, a plurality of sensing nodes (10a to 10d) are disposed and a plurality of recognition means are used cooperatively among those sensing nodes so as to recognize a situation with respect to both space and time, which has not been disclosed in any conventional technique. In addition, the present invention enables a sensing node network to be formed autonomously according to the user environment or user's desired object to be recognized so that recognition processings are executed cooperatively among the sensing nodes in the network. Then, an integral processing portion (master) is determined dynamically to optimize the recognition processing for the user and it is expected to reduce the load of the whole system more than any of conventional server client type systems. As a result, the system can recognize the circumstances of a user, sense an immediate danger and request, and enable an IT device to realize an information supply service in accordance with the danger/request. For example, there is an example of an advisory service in a shop; shopping of a customer in a shop is defined as a situation and the customer is provided with an information service according to his/her taste/circumstances, for example, providing the customer with detailed information for a good picked up by the customer, calling a clerk who is familiar with the good more when the customer seems to be interested in the good very much, introducing other related goods. And, needless to say, the function module for recognizing situation changes in a space is not limited only to the above one; a function module required for the service may be prepared in each sensing node.

Figure 7:
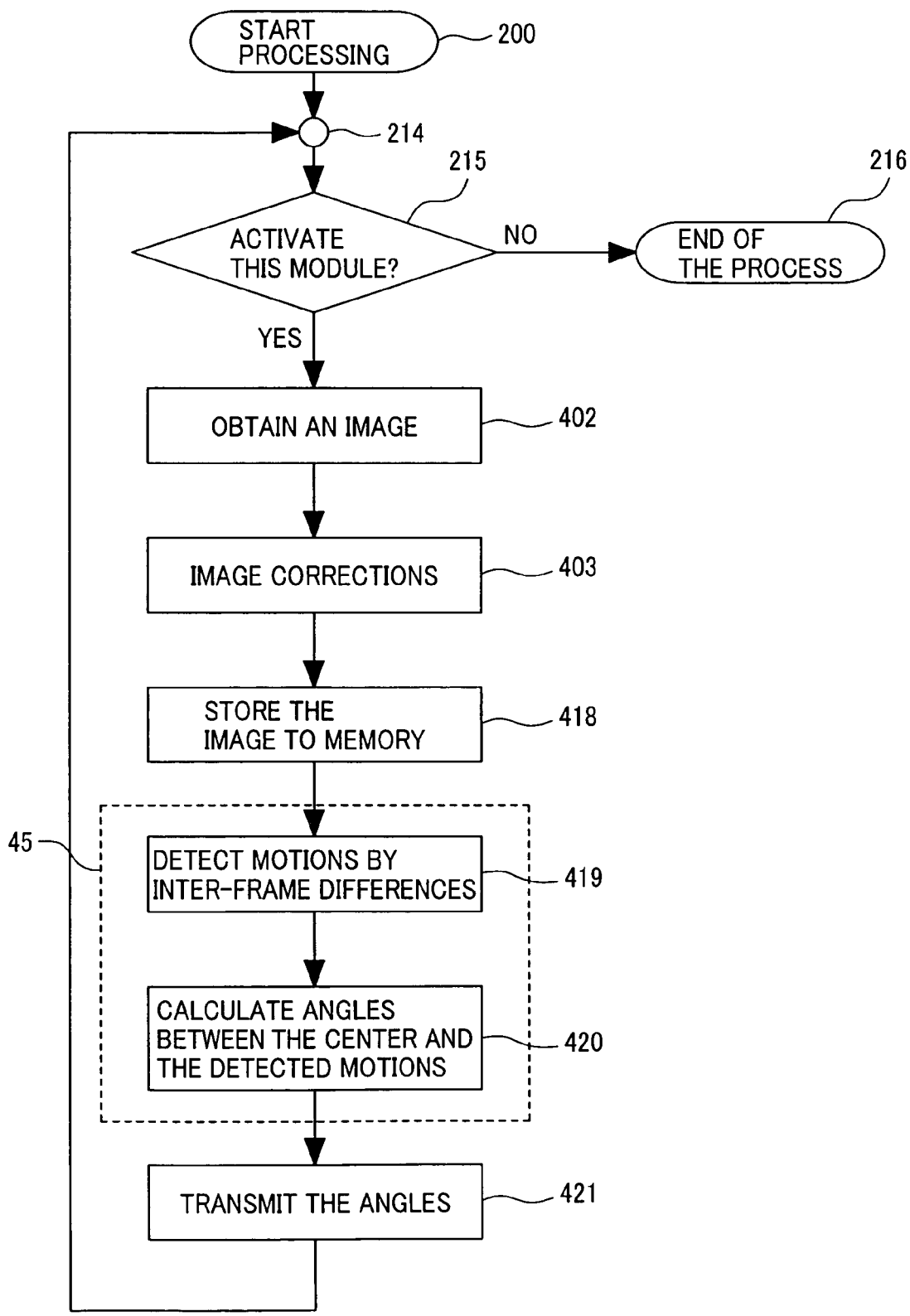
FIG. 7 is a flowchart of position detection processings in a slave sensing module.

Next, a description will be made for how master and slave sensing nodes perform processings cooperatively to detect positions of a plurality of moving objects. FIG. 7 shows a processing flow for extracting a plurality of moving objects in those sensing nodes. If the moving object extraction module is set for an operation by a master sensing node (215), an image is obtained first from a camera (402), then subjected to a YUV->RGB color conversion process, then to a filtering (shading-off) correction process (403), and then the result is retained in a frame memory (418). After that, inter-frame differences are obtained to detect motions (419), cut out a moving object, obtain an angle θ in the horizontal direction of the center points of the camera and the object, and send the angle information to the master processing portion (421).

Figure 8:
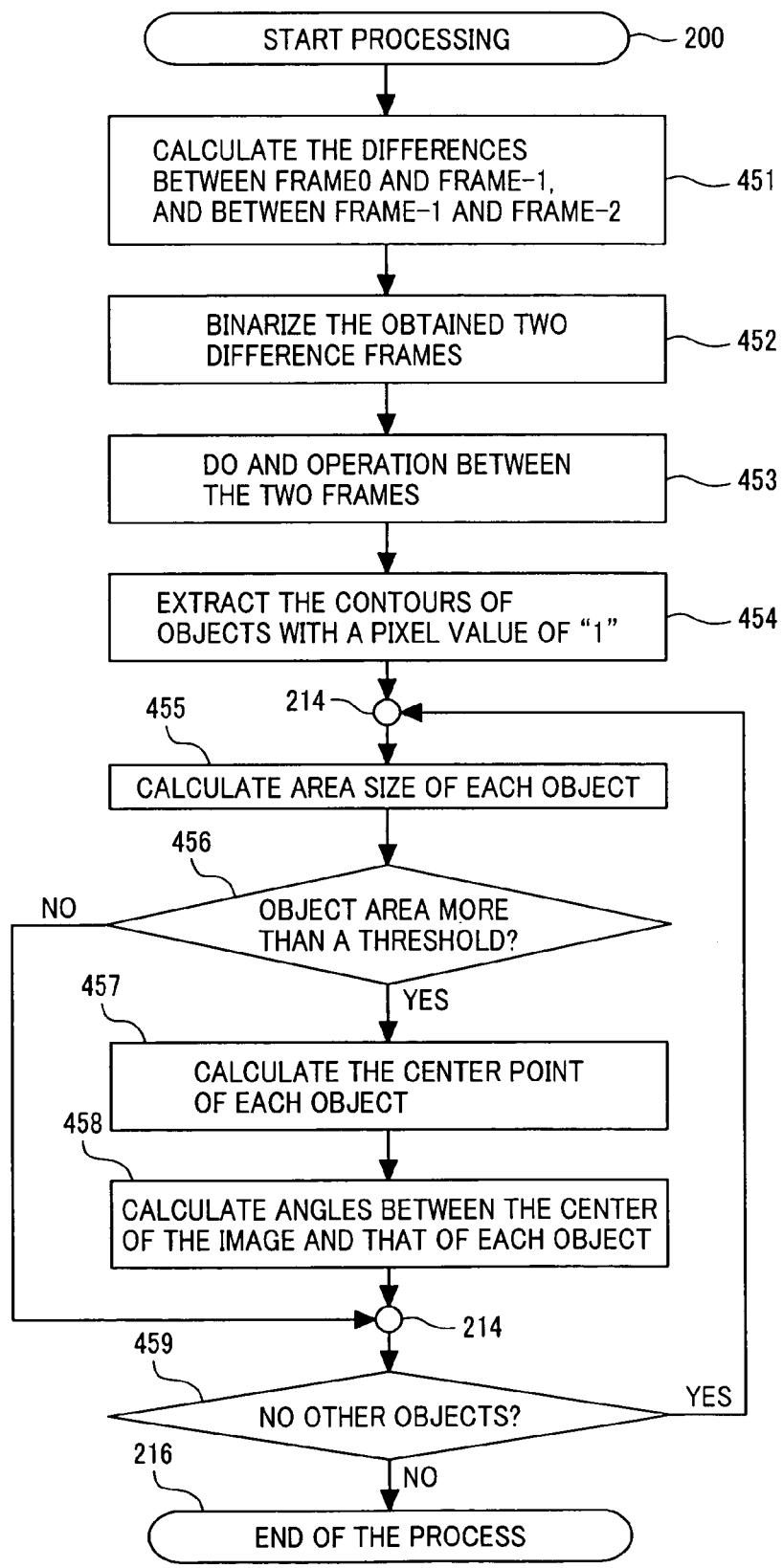
FIG. 8 is a flowchart of extracting a moving object in a slave side processing.

FIG. 8 shows a detailed flowchart (45) of the processings between motion detection by inter-frame differences and angle calculation. If the current frame image is defined as a frame A, the previous frame image is defined as a frame B, and the frame preceding the previous one is defined as a frame C that are all retained in the frame memory, a difference between pixels corresponding to the frames A and B and a difference between pixels corresponding to the frames B and C are obtained (451). Then, if each obtained difference is under the threshold value, that is, if the images corresponding to both preceding and succeeding frames are regarded as the same, they are masked in black. If the difference is over the threshold value, that is, there is a motion, the images are masked in white to generate binary motion images (452). After that, difference images of the frames A and B, as well as difference images of the frames B and C are ANDed (453) to extract moving objects.

The contours of each extracted object with a pixel value of "1" are extracted, and then the area of the object is obtained by calculation (455). And, only the objects having an area over the threshold value are extracted and subjected to angle calculation (456), thereby moving objects generated by noise whose area is ordinary smaller than the moving objects, are removed. Then, the center point of each moving object is obtained from the contour coordinates to calculate an angle θ between the center line of the camera and the center point of the object in the horizontal direction. If there are a plurality of objects, the above processings are repeated up to the last moving object (459). Finally, the number of objects having a detected area over the threshold value and the θ of each of those objects is obtained are obtained by calculation, then the results are sent to the master sensing node in the format shown in FIG. 9.

Figure 9:
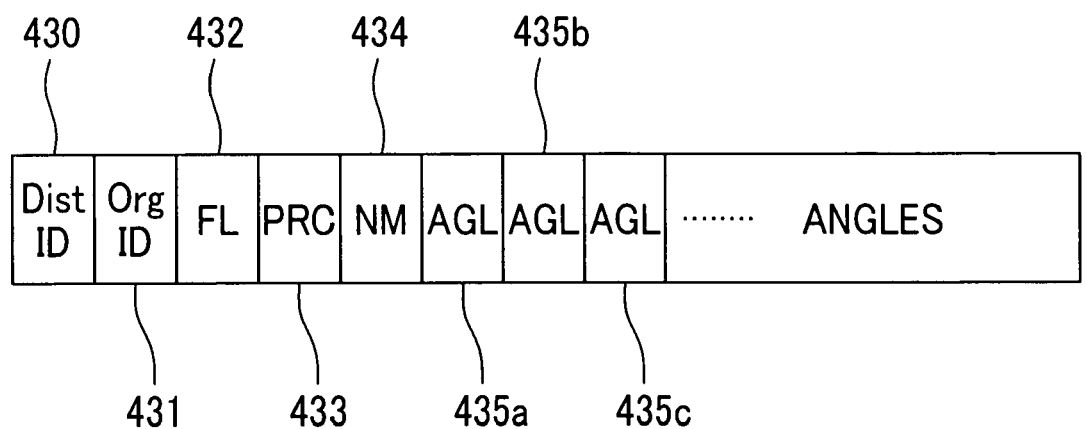
FIG. 9 is a format for sending a position detection result to a master sensing module.

FIG. 9 shows a format for sending angle information of a moving object detected in each sensing node. In FIG. 9, the reference numerals are defined as follows; (430) denotes an address of a master sensing node, (431) denotes an address of a subject (slave) sensing node, (432) denotes a flag of a data flow toward the master, (433) denotes a data type (flag of angle information here), (434) denotes the number of moving objects detected, (435a and subsequent numbers) denote the θ angles of those objects. The number of moving objects and each angle information are sent to the master and retained in the state table in the master.

Figure 10:
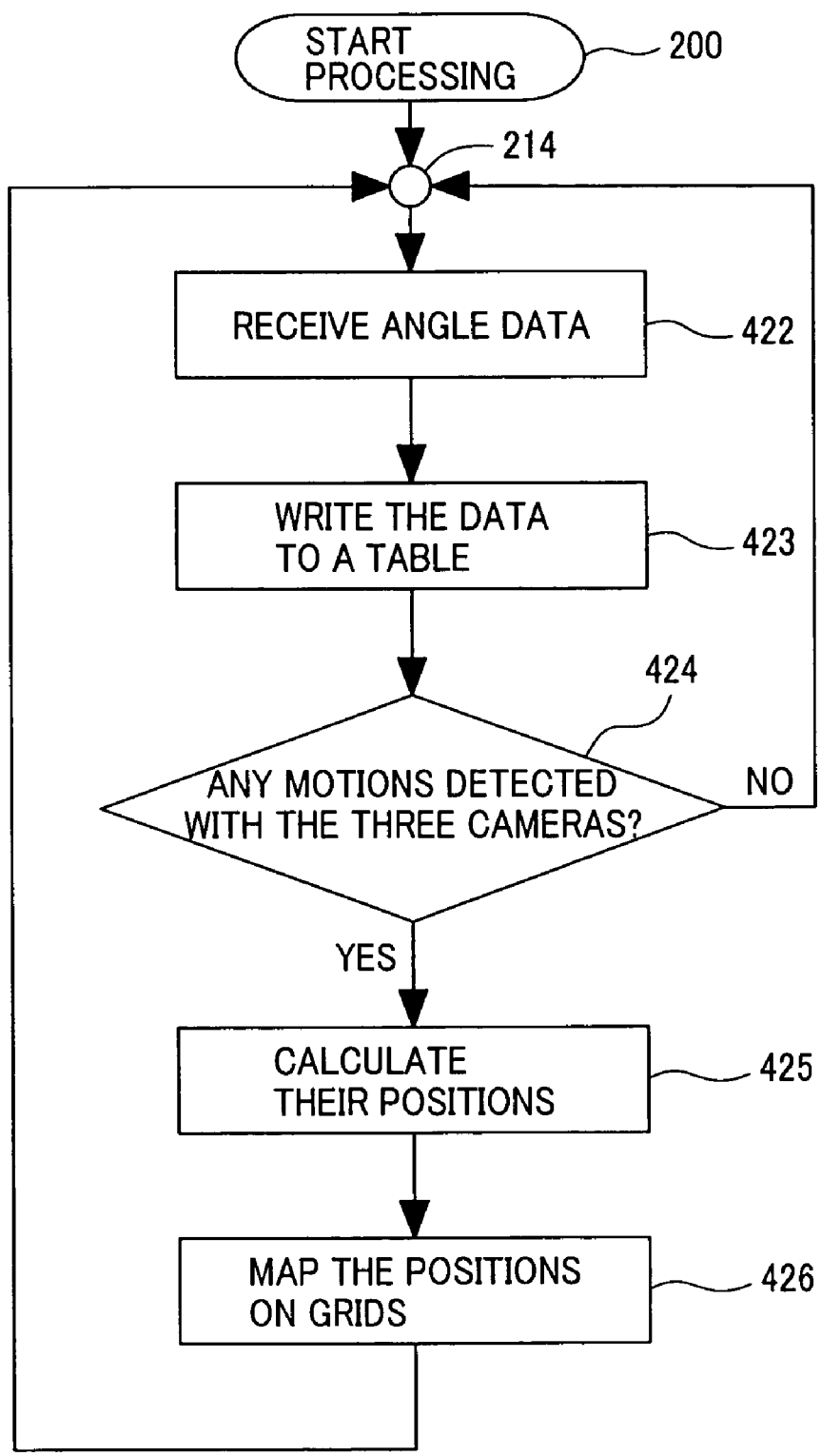
FIG. 10 is a flowchart of position detection processings in a master sensing module.

FIG. 10 shows an operation flowchart of determining an object position in a target space in a master sensing node. In the master, a position of a moving object is determined by the three-point position measurement principles (425) when angle information is received from each camera (424) according to the angle information written in the state table (423), since the position of each camera in the space is already known.

Figure 11:
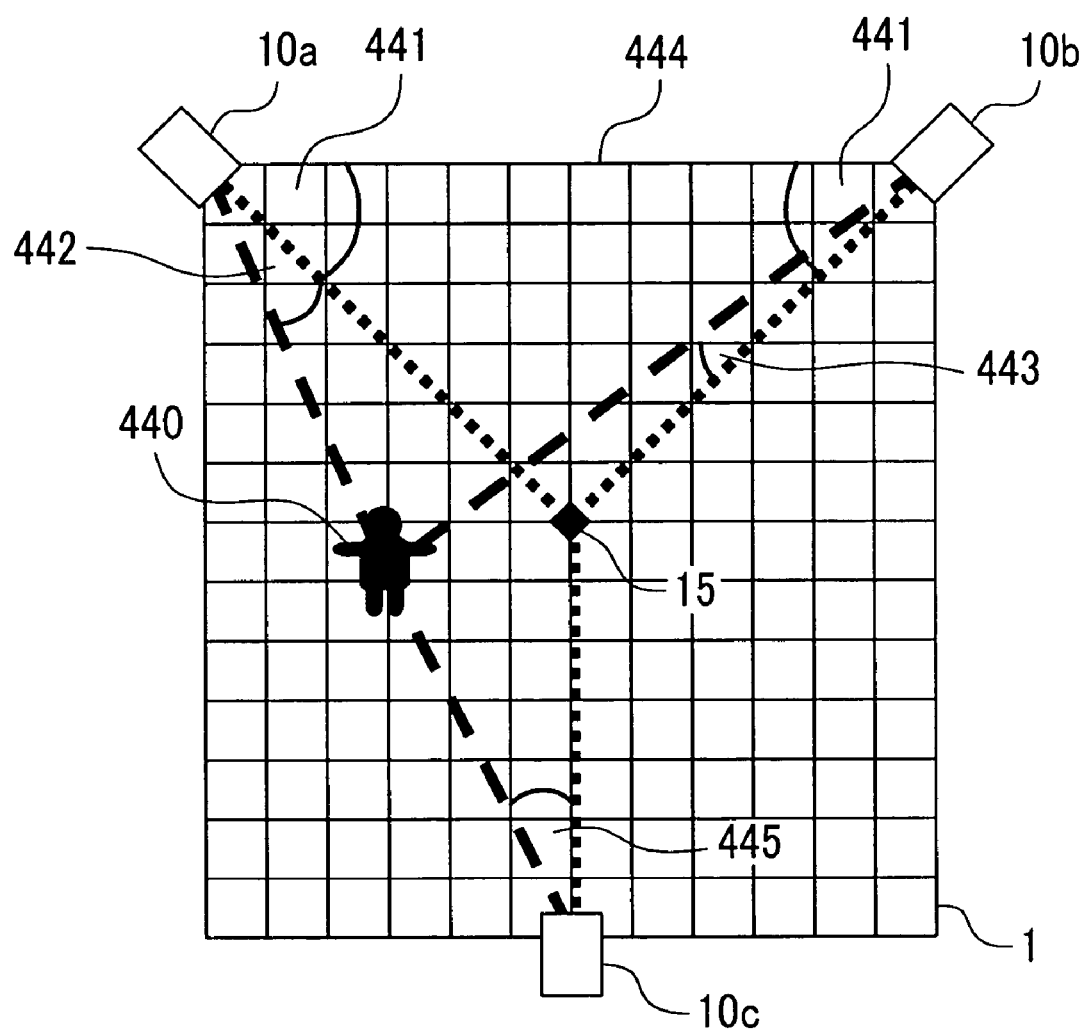
FIG. 11 illustrates how a target position in a space is detected in a master sensing module.

FIG. 11 shows a method for calculating such a position. The position of the moving object (440) is determined as follows. At first, the system determines the angle information (442) received from the sensing node (10a) as θ1 and the angle information (443) received from the sensing node (10b) as θ2, and the position of the sensing node (10a) in the space as an origin. The system also assumes the distance (444) between the sensing nodes (10a) and (10b) as "d". And, because the angle (441) θ' between the node and a line (444), as well as the "d" are already known, the position of the moving object (440) is determined by a trigonometric function according to the θ1 and θ2.

However, the above method cannot determine positions of a plurality of moving objects simultaneously, since the number of corresponding points becomes 4 and over in maximum when there are two or more moving objects (440). Therefore, angle information (445) θ3 obtained in the sensing node (10c) after a position is determined by θ1 and θ2 is used to narrow the position of a moving object from a plurality of corresponding points so as to determine the target position. Concretely, the coordinate data of the corresponding point, the position of the sensing node (10c) in the space, and the angle θ3 are used to check the matching of the coordinate data to determine the final position. Position information is written in the master's position management table in 30 cm-square grids. In addition to the three sensing nodes, if the fourth and fifth sensing nodes are disposed so as to cover areas hidden by obstacles, the position recognition accuracy is improved more. While a method for detecting motions by inter-frame differences is used in this position determination, the method uses only three adjacent frames for such position determination, thereby the robustness is high with respect to the environmental changes. And, because more than three cameras are used, a plurality of moving objects can be detected simultaneously.

Figure 12:
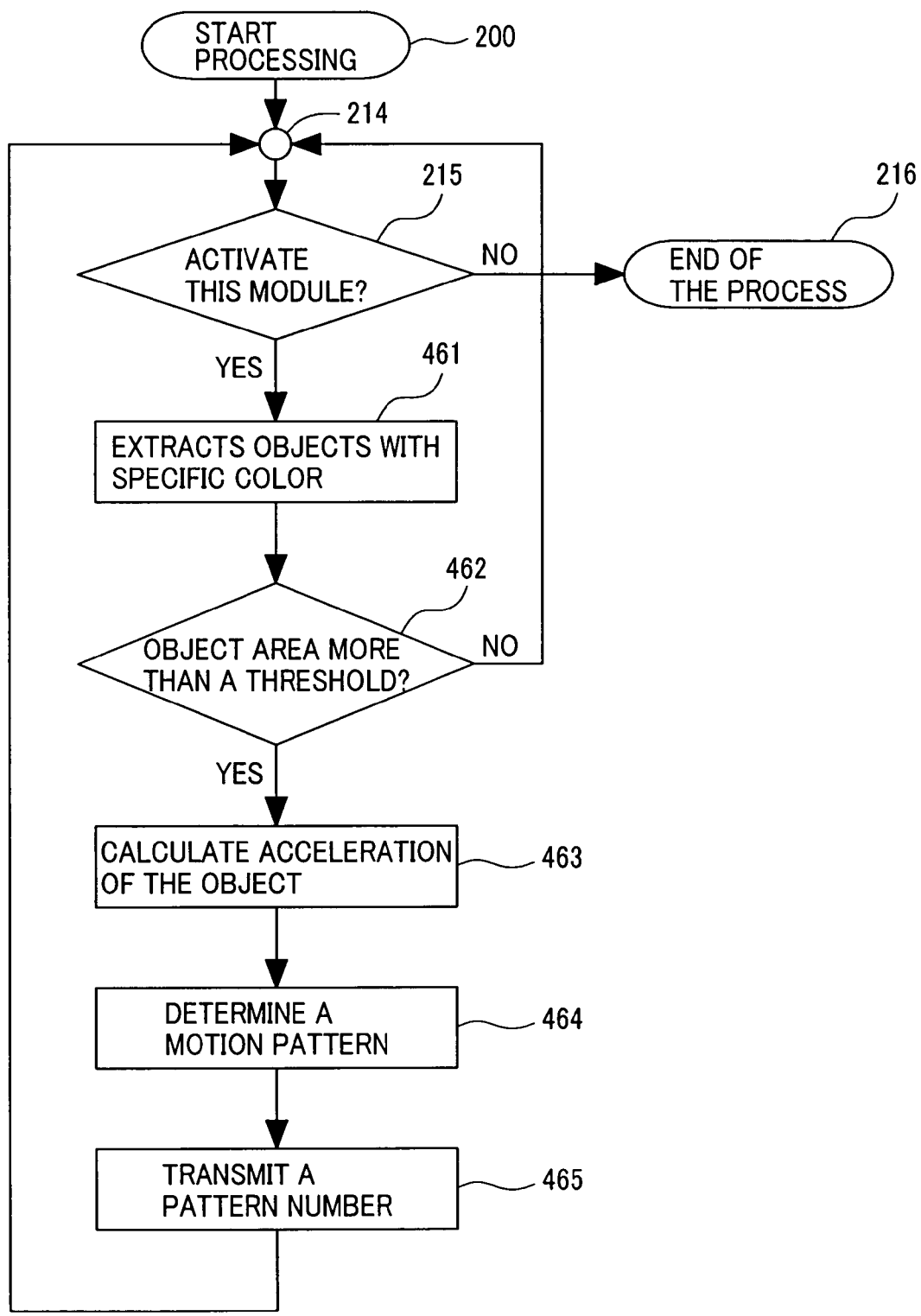
FIG. 12 is a flowchart of gesture recognition processings in a slave sensing module.
Figure 13:
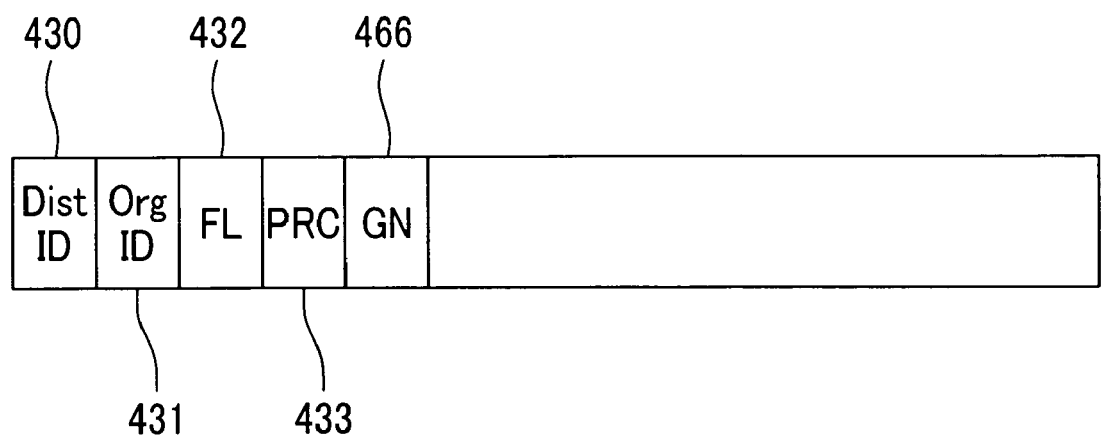
FIG. 13 is a format for sending a gesture recognition result to a master sensing module.

Next, a description will be made for a procedure for recognizing a gesture. FIG. 12 shows a processing flowchart for recognizing a gesture in a sensing node that works as a slave processing portion. In this recognition operation, a presenter (11) is given a pink marker so that the marker is tracked by detecting the color to determine a gesture. If the gesture recognition module is set for an operation by a master (215), an image fetched by cameras is subjected to HSV (Hue Saturation Brightness) color conversion to extract a pink region from the hue (461), which indicates a type of colors. The coordinates of the center point of the pink region are obtained to obtain a moving vector of the pink region for each frame (463) only when the area of the pink region detected to eliminate noise therefrom is over the threshold value (462). Then, a combination of changes of this vector with time is defined to recognize an up/down movement of the pink region as a gesture pattern (464). It is also possible at that time to obtain the locus of the pink region, then do pattern matching with such a pattern as a circle to assume the result as a gesture pattern. Gesture pattern types are shared by both slave and master sensing nodes and each gesture type (466) is notified to the master in the format shown in FIG. 13.

Figure 15:
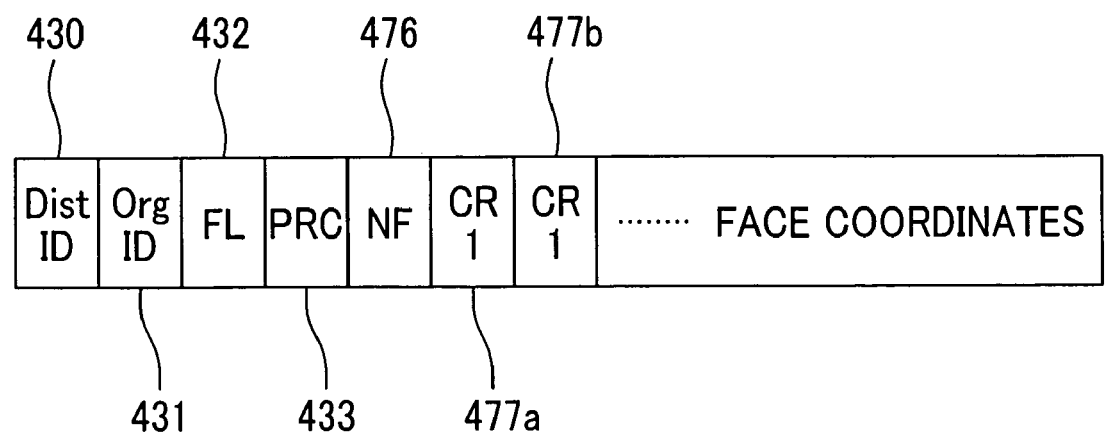
FIG. 15 is a format for sending a face extraction result to a master sensing module.
Figure 14:
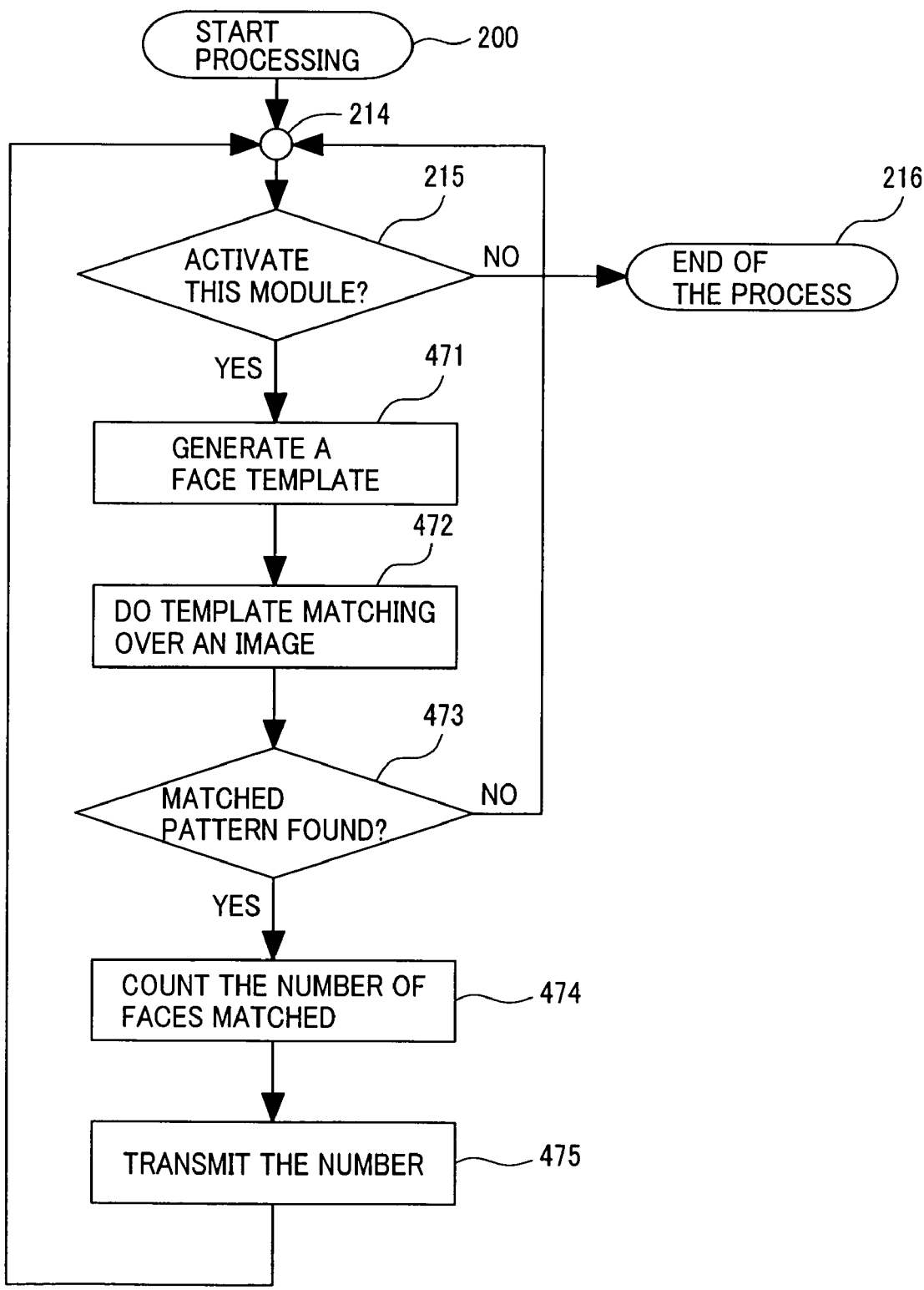
FIG. 14 is a flowchart of face extraction processings in a slave sensing module.

Next, a face detection procedure will be described. FIG. 14 shows a processing flow for detecting a face in a sensing node that works as a slave processing portion. Standard faces are defined as templates beforehand and matching with each of such templates in a plurality of sizes is done on the screen to detect a target face. If the gesture recognition module is set for an operation by a master (215) at that time, a predefined standard face template is generated by several types in each size with respect to the images fetched by cameras (471) and the images are subjected to pattern matching with the standard templates. And, according to the result of the matching, the number of faces is counted (475) and the number of faces detected (476) and the coordinates (477a and subsequent numbers) of each detected face are notified to the master in the format shown in FIG. 15.

In this embodiment, as described above, the situation recognition module is divided into sub-modules just like the moving object detection module is separated from the gesture recognition module although both of the modules are used for detecting the same actions. Because of such dividing into sub-modules, each situation recognition is reduced in data size, so that controlling of modules is done more in detail. For example, it is possible to stop the gesture recognition module while the moving object detection module is operating. The system load is thus reduced.

While the preferred form of the present invention has been described on the basis of some embodiments, it is to be understood that modifications will be apparent to those skilled in the art without departing from the spirit of the invention. For example, the method employed for detecting positions, gestures, faces, etc. in this specification may be replaced with any other method. Any of the function modules other than the position detection module, the gesture detection module, and the face detection module may be combined with others. And, in this embodiment, the sensing nodes (10a to 10c) are used to detect positions and the sensing node (10d) is used to detect faces/gestures separately, any one of the sensing nodes may be provided with all those functions. For example, if it is difficult to dispose a camera at each panel in a large exhibition site in which a plurality of panels are provided, each of a plurality of sensing nodes disposed there may be provided with the same functions, so that the function of each sensing node may be changed to a necessary one in accordance with the situation to reduce the number of sensing nodes required there.

The present invention therefore can apply to any system that recognizes a situation and makes responses autonomously in accordance with the situation.

What is claimed is:

1. An information processing system comprising:
a plurality of sensing nodes each of which has a position detection module;
a first master sensing node which is selected from said plurality of sensing nodes, which builds up a first network with sensing nodes each of which exists in an peripheral area of said first master sensing node, and which includes:
a position determination unit which determines a position of a moving object in a predetermined space based on position information of said moving object detected by sensing nodes in said first network;
a situation determination unit which recognizes a situation change in said predetermined space based on said position of said moving object; and
a master determination unit which selects a subsequently-operating master sensing node from the plurality of sensing nodes to build up a second network with peripheral sensing nodes among said plurality of sensing nodes in accordance with said situation change.

2. The system according to claim 1, wherein said second master sensing node is closest to said moving object among said plurality of sensing nodes.

3. The system according to claim 1, wherein each of said plurality of sensing nodes further has a face detection module and a gesture detection module, and
said first master sensing node instructs said plurality of sensing nodes to activate at least one detection module and to stop any other unnecessary detection modules in accordance with said situation change.

4. The system according to claim 1, wherein said first master sensing node recognizes said moving object moving out of said predetermined space and passes control to another system existing in a space into which said moving object is moving.

5. The system according to claim 1, wherein each of said sensing nodes built up said first network detects a difference between frames positioned before and after a moving image photographed by the position detection module and detects angle information of said moving object, and said position determination unit determines said position of said moving object by three-point position measurement principles using said angle information.

6. The system according to claim 1, wherein each of said sensing nodes in said first network recognizes a gesture pattern of said moving object and sends said gesture pattern to said first master sensing node, and said first master sensing node recognizes a gesture type according to said gesture pattern and recognizes said situation change with respect to a time axis.

7. The system according to claim 1, further comprising a responding device, wherein said first master sensing node sends an action command to instruct said responding device to take a predetermined action in accordance with said situation change, and said responding device takes an action in accordance with said received comment.

8. The system according to claim 1, wherein when recognizing a plurality of moving objects in said predetermined space, said first master sensing node selects at least one simultaneously-operating master sensing node from the plurality of sensing nodes each of which builds up another network with peripheral sensing nodes from said plurality of sensing nodes.

9. An information processing method implemented by an information processing system including a plurality of sensing nodes each of which has a position detection module, a first master sensing node being selected from said plurality of sensing nodes and building up a first network with sensing nodes each of which exists in a peripheral area of said first master sensing node, the method comprising:
- detecting position information of a moving object in a predetermined space by said sensing nodes in said first network;
- sending, by said sensing nodes in said first network, said detected position information to said first master sensing node;
- determining, by said first master sensing node, a position of said moving object based on said position information;
- recognizing, by said first master sensing node, a situation change in said predetermined space based on said determined position of said moving object;
- selecting, by said first master sensing node, a subsequently-operating master sensing node from the plurality of sensing nodes in accordance with said situation change; and
- building up, by said second master sensing node, a second network with peripheral sensing node among said plurality of sensing nodes.

10. The method according to claim 9, wherein said second master sensing node is closest to said moving object among said plurality of sensing nodes.

11. The method according to claim 9, wherein each of said plurality of sensing nodes further has a face detection module and a gesture detection module, and the method further comprising: instructing, by said first master sensing node, said plurality of sensing nodes to activate at least one detection module and to stop any other unnecessary detection modules in accordance with said situation change.

12. The method according to claim 9, further comprising:
- recognizing said moving object that is going out of said predetermined space; and
- object is moving by said first master sensing node.

13. The method according to claim 9, wherein said position information is angle information of said moving object detected based on a difference between frames positioned before and after a moving image photographed by a camera, and said position of said moving object is determined by three-point position measurement principles using said angle information.

14. The method according to claim 9, further comprising:
- recognizing a gesture pattern of said moving object by each of sensing nodes in said first network;
- sending said gesture pattern to said first master sensing node; and
- recognizing, by said first master sensing node, a gesture type according to said gesture pattern and recognizing said situation change with respect to a time axis.

15. The method according to claim 9, further comprising:
- sending, by said first master sensing node, an action command to instruct a responding device to take a predetermined action in accordance with said situation change; and
- taking an action, by said responding device, in accordance with said received command.

16. The method according to claim 9, further comprising: when recognizing a plurality of moving objects in said predetermined space, selecting, by said first master sensing node, at least one simultaneously-operating master sensing node from the plurality of sensing nodes each of which builds up another network with peripheral sensing nodes from said plurality of sensing nodes.

* * * * *